United States Patent [19]
Atkinson et al.

[11] 4,239,472
[45] Dec. 16, 1980

[54] CLAMPING RING FOR VACUUM-FORMING APPARATUS

[75] Inventors: Geoffrey R. Atkinson, Rothersthorpe; Alan J. Edwards, Northampton, both of England

[73] Assignee: UOP Inc., Des Plaines, Ill.

[21] Appl. No.: 41,470

[22] Filed: May 22, 1979

[30] Foreign Application Priority Data

May 26, 1978 [GB] United Kingdom ............... 23273/78

[51] Int. Cl.² ............................................. B29C 17/00
[52] U.S. Cl. ......................... 425/388; 425/DIG. 48; 269/287
[58] Field of Search ..................... 425/DIG. 48, 387.1, 425/388; 269/287

[56] References Cited

U.S. PATENT DOCUMENTS

| | | | |
|---|---|---|---|
| 3,193,881 | 7/1965 | Kostur | 425/DIG. 48 |
| 3,466,706 | 9/1969 | Asano | 425/DIG. 48 |
| 4,001,074 | 1/1977 | Pagnoui | 425/DIG. 48 |
| 4,018,551 | 4/1977 | Shuman | 425/DIG. 48 |
| 4,083,746 | 4/1978 | Thissen | 425/DIG. 48 |
| 4,097,035 | 6/1978 | Shuman | 425/DIG. 48 |

Primary Examiner—J. Howard Flint, Jr.
Attorney, Agent, or Firm—James R. Hoatson, Jr.; Barry L. Clark; William H. Page, II

[57] ABSTRACT

Apparatus for use in the vacuum-forming of sheet material in a mould comprises a clamping ring formed by a plurality of rollers mounted close to each other on an annular support which will hold the sheet material on the rim of a mould yet permit some movement of the sheet material to reduce stretching as the material is drawn down into the mould. Support members attached to the annular support are clamped to the table on which the mould is mounted.

5 Claims, 2 Drawing Figures

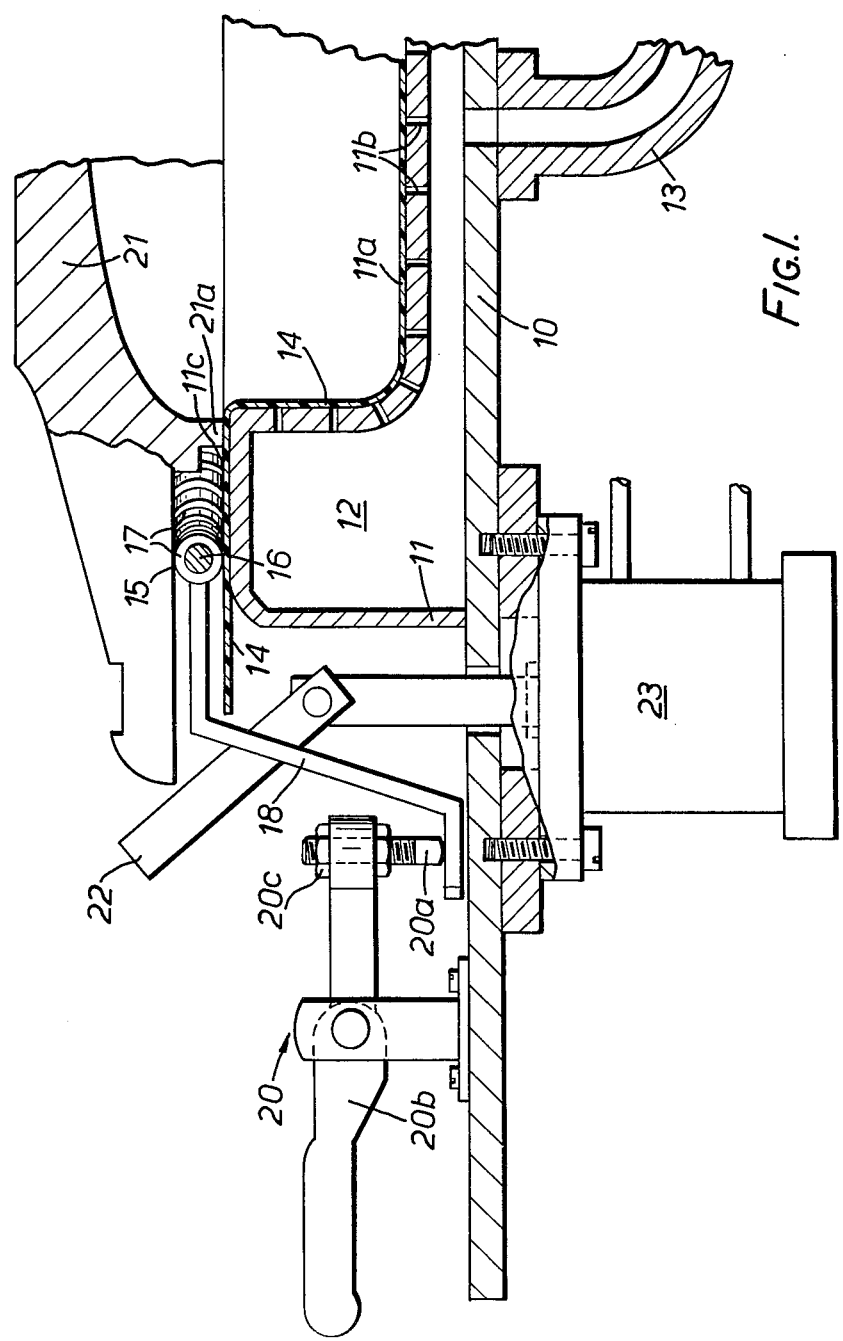

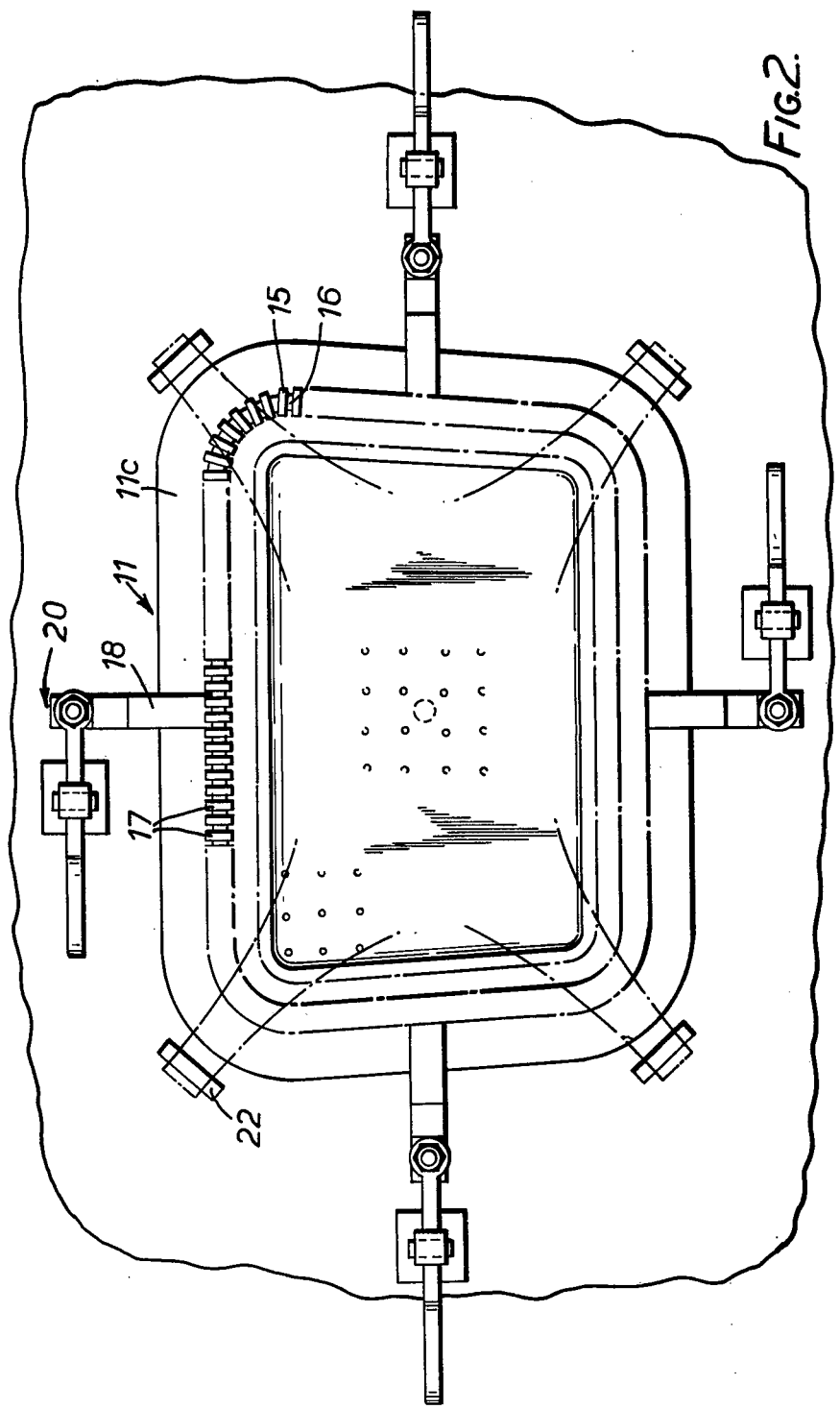

CLAMPING RING FOR VACUUM-FORMING APPARATUS

BACKGROUND OF THE INVENTION

This invention relates to apparatus for use in the vacuum-forming of sheet material in a mould.

In the art of vacuum forming sheet material, it is necessary to hold the sheet material securely on the mould as it is drawn down by the vacuum into the mould, but if the sheet material is held so firmly as to prevent any movement thereof, the sheet material is liable to be undesirably stretched or damaged, particularly if a deep mould is being used.

An object of the present invention is to provide improved apparatus designed to permit movement of the sheet material across the rim of the mould as the material is drawn into the mould but without permitting a substantial loss of vacuum.

BRIEF SUMMARY OF THE INVENTION

This object is achieved, in accordance with the present invention, by the provision of a clamping ring for slidably engaging the sheet material and clamping it to the mould, the clamping ring comprising a plurality of rollers rotatably mounted in close proximity to each other on an annular support.

BRIEF SUMMARY OF THE DRAWINGS

One embodiment of apparatus in accordance with the invention will now be particularly described by way of example with reference to the accompanying drawings in which:

FIG. 1 is a vertical half-sectional view through a vacuum-forming apparatus, and FIG. 2 is a plan view of the vacuum-forming apparatus of FIG. 1.

DESCRIPTION OF THE PREFERRED EMBODIMENT

The vacuum-forming apparatus illustrated in the drawings is designed for use in vacuum-forming sheet material for use in the manufacture of vehicle seats. The sheet material will usually be plastics sheet or plastics coated fabric. The apparatus comprises a vacuum table 10 on which is mounted a vacuum mould 11. The edge of the mould engages the table to form there-between a space 12 which communicates with a source of vacuum via a vacuum connection 13 and with the mould cavity via perforations 11b in a perforated surface 11a of the mould.

The vacuum mould is formed with a raised land or rim 11c which surrounds the perforated surface 11a of the mould and the mould cavity.

In the normal operation of a vacuum-forming mould of this type, sheet material 14 is first laid across the mould cavity with its edges resting on the land 11c and clamped to it. The space 12 is then placed in communication with the vacuum source so that as the air between the sheet material 14 and the perforated surface 11a of the mould is evacuated into the space 12 through the perforations 11b, the sheet material is drawn down into contact with the perforated surface and takes on the shape of this surface. This process involves considerable stretching of the sheet material, particularly if the mould cavity and/or the patterning of the mould surface is deep, and if this material has a patterned surface, this patterned surface is liable to be deformed by such stretching.

In order to reduce such stretching of the material, the invention provides clamping apparatus which permits some slippage of the sheet material across the land of the vacuum mould. This clamping apparatus comprises a clamping ring 15 in the form of a solid bar 16 on to which a plurality of rollers 17 have been threaded and the ends of the bar joined together to form an annulus which can be positioned to lie above the land 11c of the vacuum mould. The rollers 17 are rotatable on the annular bar and lie in close proximity to each other, preferably in contact with each other, so that a substantially uninterrupted ring of the sheet material mounted on the land 11c is engaged by the rollers. At a number, for example four, of positions spaced around the clamping ring, support members 18 are secured to the annular bar 16 of the clamping ring to enable pressure to be applied to the rollers to press them against the sheet material. These support members 17 are generally Z-shaped metal bars welded to the clamping ring at their inner ends, and at their outer ends lie closely above the vacuum table. A number of clamping members 20, equal to the number of support members, are mounted around the vacuum table, each for engaging a support member 18 and pressing it towards the vacuum table thereby to press the clamping ring against the sheet material on the vacuum mould. These clamping members 20 can be of any suitable type, but in the drawing each is illustrated as having a beak 20a which is urged downwardly against the outer end of a support member 18 by means of a toggle operating handle 20b. The pressure of the beak 20a of each clamping member against the support member 18 can be adjusted by a nut 20c. The details of the clamping members however form no part of the present invention.

In operation of the apparatus, the sheet material 14 is spread across the cavity of the mould to lie in contact with the land 11c of the mould, the clamping ring 15 is fitted onto the material which contacts the land 11c and is clamped in position by the clamping members 20. The clamping force is adjusted to provide the desired pressure between the clamping ring rollers 17 and the land 11c of the mould to grip the sheet material and prevent substantial leakage of air between the sheet material 14 and the mould 11, yet permitting some degree of sliding movement of the sheet material between the rollers and the land 11c of the mould during the vacuum-forming process.

After the sheet material has been vacuum-formed, a mould lid 21 is fitted over the cavity, the lid having a peripheral land 21a which fits inside the clamping ring and engages the sheet material resting on the land 11c of the vacuum mould. The lid is secured in position by a series of clamps 22 each actuated by a double acting air cylinder 23 to urge the lid into close contact with the sheet material lying on the land 11c of the vacuum mould.

Cold cure polyurethane foam is then introduced into the mould cavity through an orifice (not shown) in the lid which is subsequently closed. After the foam has been cured there is sufficient pressure and adhesion between the foam and the sheet material to maintain the contours of the sheet material without relapse. The vacuum can then be released, the lid and clamping ring removed, the edge of the sheet material trimmed and the sheet material, backed by a formed foam cushion, can be removed from the mould cavity.

We claim:

1. In apparatus for use in the vacuum-forming of sheet material in a mould, a clamping ring for slidably engaging the sheet material and clamping it to the mould, the clamping ring comprising a plurality of rollers rotatably mounted axially on a single annular support in close proximity to each other.

2. Apparatus according to claim 1 having support members attached to said annular support at spaced positions therearound and through which pressure can be applied to the rollers to press the sheet material against the mould.

3. Apparatus according to claim 1 including a perforated mould, wherein the clamping ring is arranged to engage a rim of the mould located above and surrounding the perforated surface of the mould.

4. Apparatus according to claim 2 including a table for supporting said mould having clamping members mounted on said table and operable to engage the support members and apply pressure thereto to press the clamping ring towards the mould.

5. Apparatus according to claim 1 including a mould lid having a peripheral land which, when in position on the mould fits within the clamping ring.

* * * * *